United States Patent Office.

JOHN A. FREY, OF MILWAUKEE, WISCONSIN, ASSIGNOR OF ONE-HALF TO WILLIAM J. KRAUSE, OF SAME PLACE.

COMPOSITION FOR THE PURIFICATION AND SEPARATION OF METALS AND ALLOYS.

SPECIFICATION forming part of Letters Patent No. 499,018, dated June 6, 1893.

Application filed December 12, 1892. Serial No. 454,920. (No specimens.)

*To all whom it may concern:*

Be it known that I, JOHN A. FREY, a citizen of the United States, and a resident of Milwaukee, in the county of Milwaukee, and in the State of Wisconsin, have invented certain new and useful Improvements in Compositions for the Purification and Separation of Metals and Alloys; and I do hereby declare that the following is a full, clear, and exact description thereof.

My invention relates to compositions for refining pig-copper in the process of making copper castings, and in separating iron and steel filings, &c., from brass chips in the remelting of the said chips for utilization in making brass-castings, and generally in the purification of various alloys and metals employed in making castings.

In carrying my invention into effect, to make say a peck of my improved composition, I take about two and a half quarts of carbonated soda-ash, one quart of silica sand, and one pint of pulverized sal-ammoniac, and mix them all thoroughly together, in the dry state, until the mass is practically homogeneous. The composition is then ready for use.

In using my composition for the purification of pig-copper, the copper is melted, in a crucible containing about seven-eighths copper and one-eighth of my composition, first putting into the crucible about half of my said composition (that is one-sixteenth of the entire contents) and next adding the copper, and melting the same, in a suitable furnace, and when the copper is melted, I add the remainder of my said composition, while the crucible is still in the fire, and let this remain for from twenty minutes to a half hour. I then remove the crucible, and before pouring, add a small quantity of zinc or "spelter," (say in the proportion of three-fourths of a pound, to a crucible holding one-hundred pounds of the melted copper and my composition,) and thoroughly stir the mass, and all impurities will rise to the surface, from whence they can be readily skimmed off, leaving the melted copper in a pure state, ready for pouring into the molds.

In the utilization of brass chips, filings and fragments, preparatory to remelting the same for the purpose of making brass castings therefrom, difficulty is experienced from the fact that said chips as they drop on the floor from the lathes, &c., in machine shops and foundries, become mixed up with iron and steel filings and chips, which, if not removed before recasting would quickly ruin the tools employed in turning and finishing the castings. In separating this iron and steel from the brass, by the use of my composition, the general method of procedure is about the same as in the purification of the copper, just described, except that with the brass, more of my said composition is needed, it usually requiring the proportions of about one-quarter of my composition to three-quarters of the brass-chips in the crucible. I put in one-half of said proportion of my composition first, and add the brass chips, and melt as before, adding the balance of my said composition while the crucible is on the fire. The crucible is then removed, and the contents stirred, which causes the particles of iron and steel which were in the brass chips to unite with my said composition, and rise to the top, from whence they are readily skimmed off, and the crucible containing pure melted brass is ready to pour.

Having thus described my invention, what I claim as new, and desire to secure by Letters Patent, is—

A composition for the purification and separation of metals and alloys in the process of making castings, consisting of carbonated soda-ash, silica sand and pulverized sal-ammoniac, mixed together, in the dry state, into a homogeneous condition, substantially as set forth.

In testimony that I claim the foregoing I have hereunto set my hand, at Milwaukee, in the county of Milwaukee and State of Wisconsin, in the presence of two witnesses.

JOHN A. FREY.

Witnesses:
H. G. UNDERWOOD,
WM. J. KRAUSE.